United States Patent [19]

Silverman

[11] Patent Number: 4,840,248
[45] Date of Patent: Jun. 20, 1989

[54] SAFETY SWITCH LIGHT FENCE

[76] Inventor: Edward J. Silverman, 301 S. Seventh Ave., Suite 325, West Reading, Pa. 19611

[21] Appl. No.: 57,095

[22] Filed: Jun. 2, 1987

[51] Int. Cl.$^4$ ............................................. B60K 28/04
[52] U.S. Cl. ..................................... 180/272; 250/221
[58] Field of Search ............... 180/271, 272, 273, 274, 180/275; 250/221

[56] References Cited

U.S. PATENT DOCUMENTS

| | | | |
|---|---|---|---|
| 1,947,079 | 2/1934 | Ellis, Jr. | 250/221 |
| 2,139,703 | 12/1938 | Taylor | 250/221 |
| 2,151,639 | 3/1939 | Golden | 180/272 |
| 3,507,350 | 4/1970 | Boyajian | 180/101 |
| 3,983,347 | 9/1976 | Brenzen | 200/157 |
| 4,172,980 | 10/1979 | Hsieh et al. | 307/9 |
| 4,364,449 | 12/1982 | Knight et al. | 180/271 |
| 4,388,980 | 6/1983 | Vig et al. | 180/271 |
| 4,391,344 | 7/1983 | Weber et al. | 180/271 |
| 4,397,371 | 8/1983 | Lynnes et al. | 180/271 |
| 4,480,713 | 11/1984 | Macht et al. | 180/268 |
| 4,683,373 | 7/1987 | Tupman | 180/272 |
| 4,701,751 | 10/1987 | Sackett | 250/221 |
| 4,734,574 | 3/1988 | Tanaka | 250/221 |

Primary Examiner—Richard A. Bertsch
Attorney, Agent, or Firm—Steele, Gould & Fried

[57] ABSTRACT

A safety switch light fence for vehicles such as fork lift trucks has a photoelectric cell system positioned across a vehicle exit opening in an area where an operater's foot is disposed when the operator allows his foot to protrude from the cab. At least one of a signaling device and an automatic cut-off are activated when protrusion of an operator's leg or foot is sensed. One or more light beams are directed across the exit opening. A foot switch can be used to sense proper placement of the operator's feet in the cab and to disable the photoelectric cell system, alarm and/or cut-off if the feet are safely stowed.

20 Claims, 1 Drawing Sheet

SAFETY SWITCH LIGHT FENCE

BACKGROUND OF THE INVENTION

1. Field of the Invention

The present invention relates to a safety device for industrial vehicles such as fork trucks and front end loaders. More specifically, the invention provides a safety control for a loader such as a fork lift truck which precludes possibly hazardous operation of the vehicle unless the operator and the operator's vulnerable appendages are fully within the vehicle.

2. Description of the Prior Art

Industrial vehicles typically include a cab portion having a control station such as an operator's seat from which the machine is operated and from which the operator can initiate and control various functions, for example load manipulation, vehicle movement, and the like. Various means have been proposed either to restrain the operator safely within the cab or to prevent operation of the vehicle unless the operator is properly in position.

U.S. Pat. No. 3,507,350—Boyajian relates to a safety control for a vehicle wherein the vehicle is prevented from movement when the operator leaves a seat in the cab. A limit switch sensitive to the weight of the operator on the seat is connected in the electric motor drive control circuit as an interlock. Similar controls are known in which interlock switch contacts are connected to sense closure of operator seat belts or other elements bearing downwardly against the operator, in each case permitting operation only when the operator is in the seat.

The foregoing controls are electric and concern electrically drivin devices. U.S. Pat. No. 3,983,347—Brenzen discloses an automatic kill switch assembly for internal combustion engines which stops the engine of a vehicle when the driver leaves the vehicle as sensed, for example, by release of hand pressure on the throttle control. The kill switch can be connected into the ignition system.

U.S. Pat. No. 4,172,980—Hsieh et al discloses a device for controlling a propulsion system of a lift truck by interrupting power flow in response to any of a plurality of non-operating conditions.

The foregoing prior art discloses various means designed to prevent intentional or unintentional movement of the vehicle when the operator is not in the safe position as sensed by certain means responsive to typical proper operation. The disclosures of these references are incorporated herein for the particulars of their circuit connections and interlocks. None of the controls of the references, however, senses a very common dangerous condition which results when an operator is in the correct position for proper operation, but allows either a body part or other means to extend out of the protected cab area into areas alongside the cab. None of the references teach interlocks for sensing dangerous conditions in this area outside the cab, and halting operations if the operator's foot or leg or the like protrudes from the cab while the operator is in proper position in the cab.

Many injuries have been sustained when loaders such as fork lift trucks are operated while the operator's leg or foot is left outside of the truck's cab. Known seat restraints merely keep the operator's torso in the seat. These devices do not restrain the operator's arms, feet or legs within the truck's cab and thus do not prevent crushing injury which occurs if the cab brushes past a wall, crate or other object or barrier nearby, or closely passes another vehicle, when the arm, leg or foot is outside of the cab. Such injuries are common.

Operators must often move in and out of the cab to accomplish various functions. Passage into and out of the cab must be kept clear to avoid impeding the operator. Unfortunately, the need for a clear passage and the need to frequently move in and out encourage the operator to use one foot for foot controls and to leave the other foot outside. Even if an operator is willing to keep both feet in the cab, or if an interlock is designed (e.g. with floor switches for each foot) to require presence of both feet for operation, a danger remains that protruding items such as other operator appendages or the operator's jacket, items such as broomsticks or the like in the cab, could contact or become entangled on items outside. In that event, the entangled item can cause the operator to be struck or pulled from the vehicle, with resultant injuries. When an operator realizes that a foot will be crushed or other injury sustained, it is often too late to retract the protruding foot or other item. In any event, operators of vehicles such as fork trucks typically concentrate so entirely on their loads that they frequently do not forsee the impending danger.

According to the invention a sensor is arranged in a danger zone outside the cab rather than in the zone of proper operation. Therefore, even if the driver is in place, with weight on the seat and hands on the controls, etc., any protruding item extending into the area to be traversed by passing obstructions will activate an alarm and/or an operator-stopping interlock. Unnecessary alarms and interlocks are prevented by placing the sensor field immediately adjacent the entryway to the cab, preferably defining a detection zone extending across the entryway or just below the entryway with a light beam traversing the entryway or running immediately adjacent the surface of the vehicle just below the entryway opeining. Protruding items such as the operator's foot become disposed in the sensed field, for example breaking the light beam and changing the state of a photocell, whereupon an alarm and/or interlock is activated.

SUMMARY OF THE INVENTION

The present invention relates to a means for detecting the protrusion of items, particularly a leg or a foot of an operator, from an industrial vehicle. More particularly, the invention is concerned with detecting an object such as a leg or foot outside of the cab of a fork lift truck, and signalling the operator and/or preventing operation of the truck until the operator and his respective appendages are all in a safe position within the cab. The invention is also applicable to vehicles of other types, for example recreational vehicles including golf carts, amusement park bumper cars, etc.

Advantageously, the means for sensing the leg or foot is located on an outside surface of the cab of the truck and includes a photoelectric cell system or "electric eye" with a paired light source and photodetector disposed across the entry or protruding only slightly from the outside surface and spaced from one another adjacent the opening to the cab. The photodetector signal is amplified and used to drive a switch means such as a relay or solid state switch, connected in the operative circuits for operation of the vehicle, and/or connected to provide power to an alarm or indicator.

The electric eye provides a light beam substantially traversing the area of the exit opening of the cab such that a leg or foot placed outside of the cab breaks the light beam. The breaking of the beam provides an indication of the limb's protrusion and/or deactivates the vehicle by cutting off the power source to stop movement, activating a braking mechanism, or at least disabling some vehicle functions. If desired, the electric eye may be placed so as to sense the protrusion of any part of the operator's body outside of the cab including, for example, the operator's arm or head.

One or more electric eye beams may be utilized, for example with plural beams from one or more sources or toward one or more detectors, defining a curtain across the passage into and out of the cab. One light beam source and a beam splitter such as a half silvered mirror or the like may be provided with two light sensitive sensors so as to cover a greater area. A diagonal beam and a substantially horizontal beam may be employed.

There may also be provided means for activating the photoelectric cell system only when both of the operator's feet are not on the floor of the cab as sensed by foot-operated limit switches or by photoelectrics in the cab.

Accordingly, it is an object of the invention to provide a safety device and/or warning means to alert an operator of a fork truck, front end loader or similar vehicle of the protrusion of a leg or foot from the vehicle when the vehicle is made operational.

It is a further object of the invention to cease operation of the vehicle or at least some of its functions, when a leg or foot protrudes from the cab.

It is a yet still further object of the invention to provide the vehicle with a plurality of beams from one or more light sources to one or more photosensors for detecting a protrusion from the cab at any of a number of positions.

It is still another object of the invention to provide a photoelectric interlock system for a fork truck, which is activated when both of the operator's feet are not on the floor of the cab.

Other objects and a fuller realization of the invention will be understood by referring to the following description and claims, taken in conjunction with the accompanying drawings, wherein like reference characters refer to similar parts throughout the several views.

DESCRIPTION OF PREFERRED EMBODIMENTS OF THE INVENTION

Figure 1:
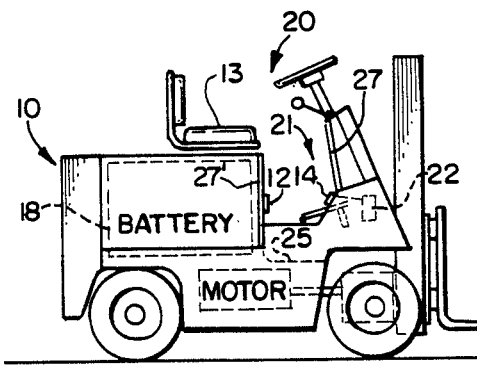
FIG. 1 is a perspective view of a front loader vehicle with the photoelectric cell system in accordance with a preferred embodiment of the invention.
Figure 5:
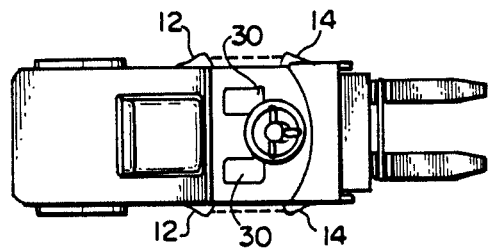
FIG. 5 is a top plan view of a fork truck equipped with the photoelectric cell system of the invention.

Although certain specific terms are used in this description for the sake of clarity, these terms are intended to describe only the particular structure of the invention selected for illustration in the drawings, and are not intended to define or limit the scope of the invention.

As shown in FIG. 1, a front end loader is illustrated in a preferred embodiment as an electrically powered fork lift truck 10 having an electric battery 18 which supplies power for operating the vehicle and accessories. Other possibilities for such fork trucks include propane-fuelled internal combustion engines and the like. In each case, electric conductors for carrying power from the battery to various devices and/or for carrying signals such as ignition pulses associated with a distributor, are available and can be open circuited using a suitable switch means. The vehicle or truck 10 could be a fork truck, front end loader, bulldozer or like industrial vehicle; or alternatively could be a recreational vehicle such as a golf cart or amusement park bumper car, in each of which there is a danger of injury to protruding appendages. The fork truck or other vehicle includes a cab portion 20 with entry and exit openings 21 on each side of the operator's station, through which the operator must pass, preferably without impediment. The operator's station includes a seat 13, a floor 25 and suitable manual controls responsive to hand and/or foot manipulation for operating the vehicle 10. The front entry and exit openings 21 are bounded on each side of the vehicle 10 by side posts 27, 27' extending upwards from a floor or sidewall portion between the side posts. Mounted on the side posts 27, 27' is a photoelectric system comprising at least one light source or emitter 12 and at least one photodetector or sensor 14 responsive to incidence of light from source 12. The source 12 and sensor 14 can be mounted on facing surfaces of the entryway, or facing one another on an outer surface of the vehicle adjacent the entryway.

The photoelectric system including the paired source and sensor 12, 14, respectively, is arranged so as to produce an electric output signal when an opaque object such as a leg or foot protrudes through the opening 21 and interrupts the beam. The output signal produced by the photoelectric system 12, 14 is used to actuate a suitable operator alert system, for example, an audio device such as buzzer 22, or to deactivate one or more functions of the vehicle, for example by disabling power to the wheels. The output of the photoelectric system can be a switch closure or voltage level connected to remove power from vehicle elements such as the motor driving the vehicle, or can positively connect power to a device intended to mitigate hazardous conditions, such as a solenoid operated brake for decelerating the vehicle. The photoelectric pair output can be connected as an automatic kill switch, for example as described in said U.S. Pat. No. 3,983,347—Brenzen.

In regular operation, the operator of the truck 10 frequently enters and exits the cab 20. The truck 10 may be of the type in which the operator normally stands during operation of the truck or the truck may be provided with an operator's seat 13. If a seat is provided, conventional restraint systems such as disclosed in U.S. Pat. No. 4,397,371, the disclosure of which is also incorporated, can be included together with the detector and cut-off of the invention. The operator upon initially powering up the truck 10 simultaneously powers up the photoelectric system 12, 14. Thereafter whenever truck 10 is made operational, a protrusion such as a foot or leg of the operator or other object traversing the entryway (or possibly resting against the vehicle outside the cab 20) will break the path of the light (either visible light or invisible light such as infrared) passing between the emitter 12 and the photodetector or sensor 14. This produces an output signal that connects power to, or otherwise activates, an audio signal system and/or a motor control or automatic kill switch 22. Under such conditions the operator as well as other persons in the area may be alerted and/or the operator may be prevented from operating the truck 10 until his protruding foot or leg is safely within the cab 20. Use of an indicator having an externally discernable output is recommended, whereby an operator of a different vehicle, for example another fork truck approaching, will be aware that he cannot pass closely by truck 10 without possible danger to the operator. An intended effect of all these alarms, indicators and interlocks is to encourage good safety habits on the part of all vehicle operators, especially to encourage them to keep their feet inside the cab.

Figure 2:
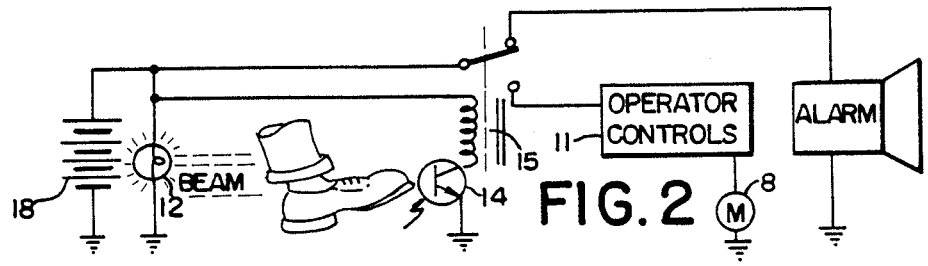
FIG. 2 is a schematic illustration of a photoelectric cell system utilized in the vehicle of FIG. 1.

The photoelectric system of the invention in a simple preferred form is illustrated in FIG. 2. Power is supplied by battery 18 to the emitter 12 whose beam is normally received at sensor 14, for example a phototransistor. The phototransistor conducts so long as the beam is unbroken, and via contacts of relay 15 connects power to motor 8 and other functional parts of truck 10, through appropriate operator controls 11. When the light beam is interrupted as shown, the relay changes state and the current is removed from controls 11 and motor 8, and passed to device 22 which, for example, alerts the driver and/or positively disables current working conditions of the truck 10, for example by activating wheel brakes to stop the vehicle and/or a clutch to mechanically uncouple the motor 8 from driven parts. The deactivation may be a temporary disconnection or in the case of an internal combustion engine may stall the engine and require restarting.

Figure 3:
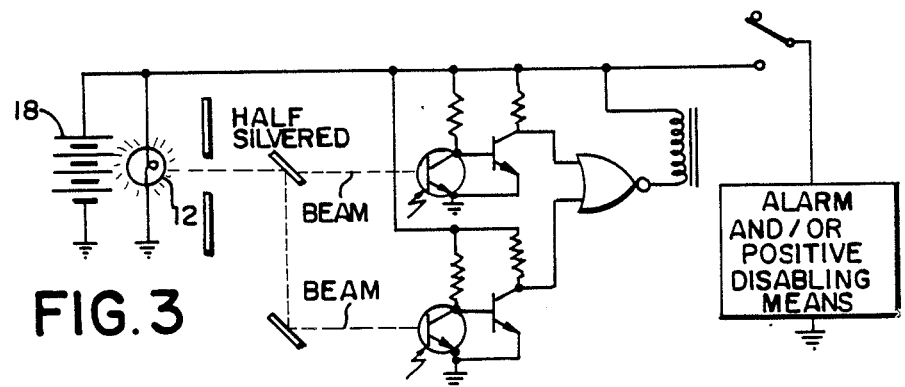
FIG. 3 is a schematic view of a photoelectric cell system with a beam splitter which is used in the invention; and, FIG. 4 is a schematic illustration of a photoelectric cell system for use in a stand-up type vehicle.

As shown in FIG. 3, the photoelectric system may be provided with a beam splitting prism means 23 which provides a plurality of spaced light beams to respective sensors 14,14' so as to cover a greater area along the opening 21 in the manner of a light curtain across opening 21. In such a case a NOR gate 24 or the like may be utilized so that breaking the beam to either sensor 14, 14' will activate device 22 and disable or positively halt operation of vehicle 10. It is also possible to employ a light level responsive system such that only breaking of a predetermined proportion of a total intensity from a number of beams will activate the interlock.

Figure 4:
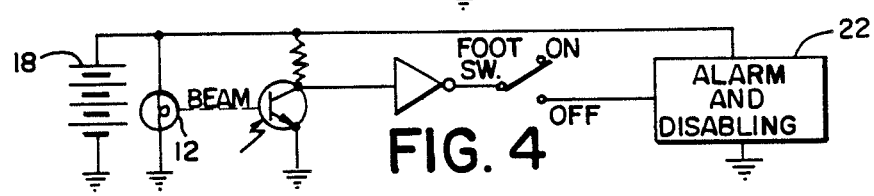

In the case of a stand-up fork lift truck, operation of the photoelectric system is not ordinarily required because when the vehicle is operational the driver must have both feet on the floor of the cab in order to stand. FIG. 4 illustrates a photoelectric system which becomes activated when one of the operator's feet leaves the floor of the cab of the truck as detected by a pressure sensitive pad switch 30. Similar to the system of FIG. 1, a battery 18 provides the power source for a light emitter 12 which is associated with a sensor phototransistor 14 or the like, whose collector which is pulled up to the DC supply voltage by resistor 28 when the beam is broken and the phototransistor stops conducting. The voltage level on the collector is inverted and supplied as an input to alarm and/or cut-off 22 through switch 30, which includes one or more pressure sensitive pads on the floor of the cab.

In operation, the output of the phototransistor is low so long as the beam in unbroken. If the stand-up operator has his feet on the pressure sensitive pad(s) of switch 30, the input to means 22 is low. Raising either foot off a pad closes switch 30 and causes the collector of the phototransistor 14 of the photoelectric cell to become operational. If an object such as a foot or leg breaks the light beam then there is a high output through switch 30 to device 22 that contains an audio device such as a buzzer which alerts the operator. Simultaneously, a kill switch assembly preferably deactivates moving parts of the truck 10.

In accordance with the present invention it is apparent that it is now possible to automatically deactivate a fork truck or the like when the operator leaves the cab of the vehicle either accidentally or on purpose and further if there is inadvertent protrusion of a foot or leg which may result in accidental injury.

From the foregoing it is believed that those familiar with the art will readily recognize and appreciate the novel concepts and features of the present invention. Numerous variations, changes and substitutions or equivalents will present themselves from persons skilled in the art and may be made without necessarily departing from the scope and principles of this invention. As a result, the embodiment described herein is subject to various modifications, changes and the like, with the scope of this invention being determined solely by reference to the claims appended hereto.

What is claimed is:

1. In a vehicle having multiple exit openings about an operator station from which an operator controllably operates various functions of the vehicle, the improvement comprising:
   a photoelectric cell system disposed substantially across said multiple exit openings about the operator station, including at least one light source and a plurality of light sensors spaced from the light source, the light sensors producing respective signals responsive to obstruction of a respective beam adjacent the corresponding exit opening from the source to the respective sensor, and means responsive to the respective signal for operating at least one of an indicator and a device for disabling of the vehicles.

2. The vehicle of claim 1, wherein the vehicle is a fork lift truck.

3. The vehicle of claim 1, wherein the photoelectric cell system comprises at least one of a plurality of light sources and a plurality of the light sensors, arranged to define a plurality of beams at the exit opening.

4. The vehicle of claim 3 further comprising a beam splitter, the photoelectric cell system having at least one light source and at least two light sensors, a beam emitted from the at least one light source being split by the beam splitter into spaced beams directed to the at least two light sensors, obstruction of either of the spaced beams being operable to activate said means responsive to the signal.

5. The vehicle of claim 1 wherein said photoelectric cell system produces an electrical output signal when an object breaks the beam between the light source and the light sensor, and further comprising an audio means activated by said output signal.

6. The vehicle of claim 5 wherein said light is visible.

7. The vehicle of claim 5 wherein said light is invisible.

8. The vehicle of claim 1 wherein the source and the sensor are on facing portions of the exit opening and the beam is disposed in the exit opening, the beam including a substantially horizontal light beam.

9. The vehicle of claim 8 wherein the beam also includes a diagonal light beam.

10. The vehicle of claim 1, wherein the beam extends adjacent the exit opening at a space from a wall of the vehicle.

11. The vehicle of claim 10, wherein the light source and the light sensor are mounted on an external surface of the vehicle adjacent the exit opening.

12. The vehicle of claim 1 further comprising a switch means disposed in a floor of the vehicle at the operator's station, the switch means being connected to the photoelectric system, and the switch means disabling operation of said photoelectric system when at least one of an operator's feet are disposed on the switch means.

13. The vehicle of claim 12 wherein the switch means comprises at least two switches connected to one another and spaced for operation by both of the operator's feet.

14. The vehicle of claim 12, wherein said switch means is open when both of the operator's feet are on the cab floor and the vehicle is operational.

15. The vehicle of claim 1 further comprising a vehicle operation cut-off means responsive to said photoelectric cell system and operable to positively deactivate the vehicle when the beam is broken.

16. The vehicle of claim 15, wherein the cut-off means include a brake adaped to positively stop vehicle movement.

17. The vehicle of claim 15 including audio alarm means operative upon said breaking of the beam.

18. The vehicle of claim 1, wherein the beam is positioned to be obstructed by an operator's foot protruding through the exit opening as the operator sits in place in the operator station.

19. In a vehicle having an operator station from which an operator controllably operates various functions of the vehicle, the improvement comprising:
a photoelectric cell system disposed substantially across an exit opening from the operator station, including a light source and at least two light sensors spaced from the light source, a beam splitter disposed such that a beam emitted from the light source is split by the beam splitter into spaced beams directed to the at least two light sensors, the light sensors producing a signal responsive to obstruction of either of the spaced beams adjacent the exit opening, and means responsive to the signal for operating at least one of an indicator and a device for disabling of the vehicle.

20. In a vehicle having an operator station from which an operator controllably operates various functions of the vehicle, the improvement comprising:
a photoelectric cell system disposed substantially across an exit opening from the operator station, including a light source and a light sensor spaced from the light source, the light sensor producing a signal responsive to obstruction of a beam adjacent the exit opening from the source to the sensor, means responsive to the signal for operating at least one of an indicator and a device for disabling of the vehicle; and a switch means disposed in a floor of the vehicle at the operator's station, the switch means being connected to the photoelectric system, and the switch means disabling operation of said photoelectric system when at least one of an operator's feet are disposed on the switch means.

* * * * *

UNITED STATES PATENT AND TRADEMARK OFFICE
CERTIFICATE OF CORRECTION

PATENT NO. : 4,840,248

DATED : June 20, 1989

INVENTOR(S) : SILVERMAN

It is certified that error appears in the above-identified patent and that said Letters Patent is hereby corrected as shown below:

```
Column 2, line 40, "opeining" should be --opening--.
Column 7, line 26, "adaped" should be --adapted--.
```

Signed and Sealed this

Fifteenth Day of May, 1990

Attest:

HARRY F. MANBECK, JR.

*Attesting Officer*    *Commissioner of Patents and Trademarks*